United States Patent [19]
Koyamada

[11] Patent Number: 5,222,202
[45] Date of Patent: Jun. 22, 1993

[54] METHOD AND APPARATUS FOR VISUALIZATION OF ISO-VALUED SURFACES

[75] Inventor: Koji Koyamada, Hadano, Japan

[73] Assignee: International Business Machines Corporation, Armonk, N.Y.

[21] Appl. No.: 596,144

[22] Filed: Oct. 11, 1990

[30] Foreign Application Priority Data

Oct. 13, 1989 [JP] Japan .................. 1-265309

[51] Int. Cl.$^5$ .............................................. G06F 15/72
[52] U.S. Cl. ..................... 395/123; 395/126
[58] Field of Search ............ 395/119, 123, 126, 134

[56] References Cited

U.S. PATENT DOCUMENTS

| | | | |
|---|---|---|---|
| 4,275,413 | 6/1981 | Sakamoto et al. ............ | 358/80 |
| 4,709,231 | 11/1987 | Sakaibara et al. ........... | 395/126 X |
| 4,710,876 | 12/1987 | Cline et al. ................. | 395/123 X |
| 5,113,490 | 5/1992 | Winget ....................... | 395/134 X |

OTHER PUBLICATIONS

IBM Tech. Disclosure Bulletin, vol. 32, No. 1, Jun. 1989, "Method to Reconstruct Solid Elements into Linear Tetrahedral Elements".

*Primary Examiner*—Mark K. Zimmerman
*Attorney, Agent, or Firm*—Mark S. Walker

[57] ABSTRACT

A method and apparatus for generating image data representing an iso-valued surface. A series of points in three dimensional space each having positional data and an assigned scalar value is analyzed by dividing the space into tetrahedral elements, generating tetrahedral element representative normal vectors, generating vertex representative normal vectors data, and calculating pixel values for viewing rays passing through the tetrahedra. Tetrahedral elements have the advantage of requiring only the solution of linear equations instead of quadratic equations. The use of representative normal vector data rather than geometric data for each associated triangle greatly reduces the storage requirements for processing the data. The reduced data storage and associated reduced processing time allows generation of iso-valued surfaces at high speed with a minimum memory requirement.

6 Claims, 5 Drawing Sheets

PARABOLIC WEDGE
ELEMENT

THIRTY-SIX LINEAR
TETRAHEDRAL ELEMENTS

METHOD AND APPARATUS FOR VISUALIZATION OF ISO-VALUED SURFACES

BACKGROUND OF THE INVENTION

1. Field of the Invention

This invention relates to a method and an apparatus for generating an image representing an iso-valued surface, i.e. a set of points with a specified scalar value, from a set of points each having a scalar value, where the points are distributed in three dimensional space. The points and associated scalar values are generated by methods such as the three-dimensional finite element method (3D FEM).

2. Prior Art

"Volume Rendering" has recently been studied in the field of medical image processing, and has some application to the visualization of numerical simulation results. Though volume rendering is applicable to the three-dimensional finite difference method (3D FDM), it cannot be applied directly to the 3D FEM, which has no regular connections among neighboring grids (elements), because volume rendering assumes that a scalar field is defined on orthogonal grids.

The FEM divides an area to be analyzed into polyhedrons called elements, approximates the potential distribution in each element to a simple function, and obtains a scalar value at each node point. Generally, this method defines node points P irregularly, depending upon the nature of the area to be analyzed, as shown in FIG. 10.

When the volume rendering method is applied to the FEM output, scalar values defined on irregular grid points (node points) must be mapped to a regular grid Q (hexahedron). Information contained in the original 3D FEM analysis results may be lost, as in the case of the node points in region R of FIG. 10, unless the grid to which the 3D FEM results are mapped is positioned appropriately. Not a little information is lost in mapping, because the appropriateness depends heavily on the arrangement of the irregular grid of the FEM.

One method of extracting iso-valued surfaces without mapping node point information to a hexahedral grid is presented in the inventor's paper, "Visualization of Equi-Valued Surfaces and Stream Lines," *I-DEAS/CA-EDS International Conference Proceedings*, Oct. 1988, pp. 87–97. This method is also disclosed in "Method for Reconstructing Solid Elements into Linear Tetrahedral Elements," IBM Technical Disclosure Bulletin, 06–89, pp. 340–342. The method in these papers creates a node point and a scalar value for it at each of the face centers and the volume center of each volume element, and then divides each volume element into linear tetrahedral elements defined by the node points. FIG. 11 shows the division of a parabolic wedge element into thirty-six linear tetrahedral elements.

FIG. 12 shows one example of a created tetrahedral element. Assume that the scalar values of vertices P, Q, R, and S are 8, 2, 4, and 0, respectively. Visualization of the iso-valued surface with the scalar value 6 is considered below. Points X, Y, and Z, where the scalar value is 6, are searched by linear interpolation. The triangle defined by those three points X, Y, and Z is the approximation of the iso-valued surface within the tetrahedron PQRS.

The prior art method obtains geometric data of the iso-valued surface approximated by triangles, in other words, position data and connection data of the triangles, and performs shading on the basis of the data. However, the volume of the geometric data of the triangles is apt to be enormous. In particular, when multiple iso-valued surfaces are visualized as semi-transparently shaded images, a large volume of computer storage is required, and considerable time is required to generate the image data, because the geometric data of the triangles must be generated for each iso-valued surface.

SUMMARY OF THE INVENTION

The present invention is directed to generating image data of a shaded iso-valued surface directly, without using intermediate geometric data of triangles to represent the iso-valued surface.

The method operates by dividing three dimensional space into tetrahedral elements that have as vertices the points provided with scalar values thereby generating an element list relating tetrahedral elements to their vertices. Next, for each tetrahedral element, a tetrahedral element representative normal vector is generated representing the normal vectors of all iso-valued surfaces contained in the tetrahedral element. This normal vector is generated based on the position data and scalar values of the vertices of the element. Next, a vertex representative normal vector is generated for each vertex of the tetrahedral element based on the representative normal vectors of the tetrahedral elements that comprise the vertex. Finally image data is generated representing the iso-valued surface with the specified scalar value according to the element list of tetrahedral elements and the vertex representative normal vector data.

DESCRIPTION OF THE PREFERRED EMBODIMENT

Figure 1:
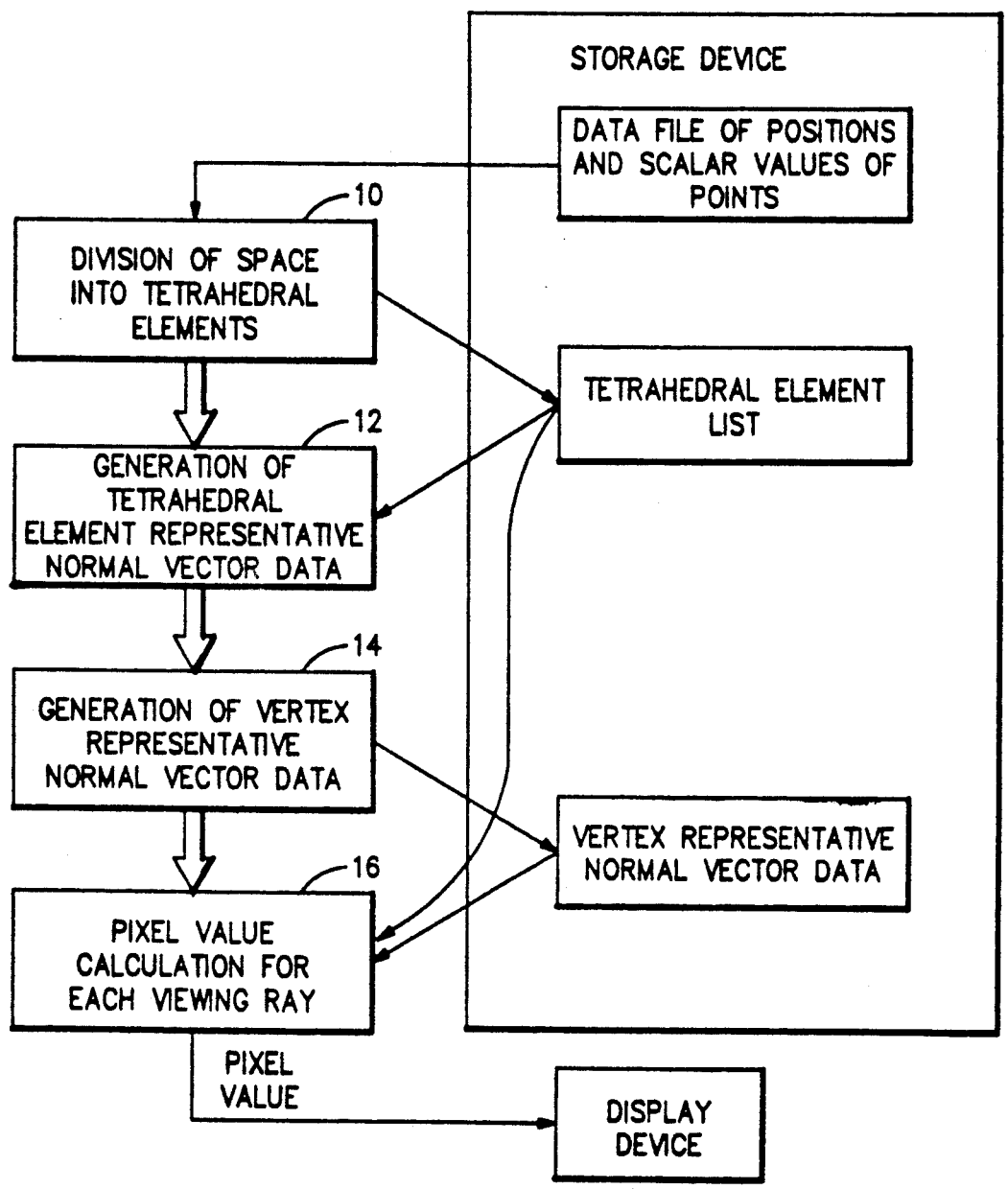
FIG. 1 is a flow chart schematically illustrating data processing in accordance with the invention.

All iso-valued surfaces within a tetrahedron have the same normal vector, and scalar values change linearly along any segment, which is a very convenient property for direct shading. The proposed invention utilizes this property of a tetrahedron. The steps of the invention are described with reference to FIG. 1.

Position data and scalar values are given to points distributed in a three dimensional space, and stored in a storage device.

(a) First, the space is virtually divided into tetrahedral elements that have as vertices the points provided with scalar values. An element list relating each tetrahedral element to its vertices is generated and stored in the storage device (block 10).

(b) The element list is referenced and data for a tetrahedral element representative normal vector contained in each tetrahedral element are generated based on the position data and the scalar values of the vertices of that tetrahedral element (block 12).

(c) For each vertex of each tetrahedral element, data of the normal vector associated with that vertex (hereafter referred to as the vertex representative normal vector) are generated based on the tetrahedral element representative normal vectors of the tetrahedral elements that comprise the vertex. The generated data are stored in the storage device (block 14).

(d) Image data representing the iso-valued surface with the specified scalar value are generated according to the element list and the vertex representative normal vector data stored in the storage device (block 16). Pixel values are generated for each of the viewing rays.

In step (a), the space is divided into tetrahedral elements as defined only by the node points with previously assigned scalar values. Alternatively, new node points may be added so that the space may be divided into tetrahedral elements as defined by the node points, including the new ones.

OPERATION

The invention will be explained with reference to an example in which the image data of an iso-valued surface are generated from 3D FEM analysis results.

a) Generation of Tetrahedral Element List

Figure 11:
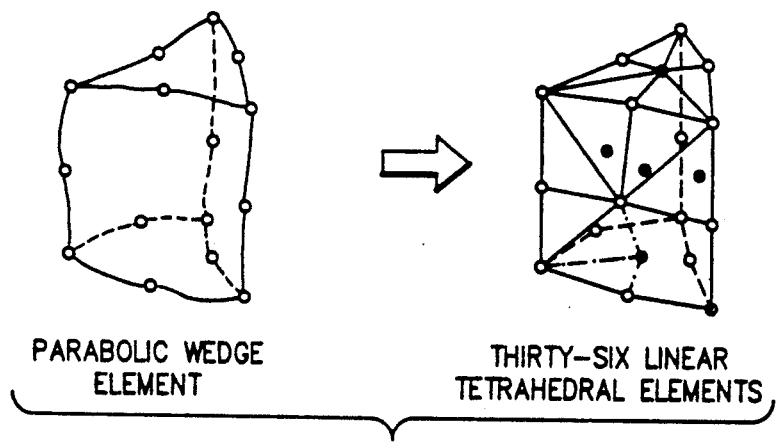
FIG. 11 is an illustration of the division of a parabolic wedge element into thirty-six linear tetrahedral elements.
Figure 12:
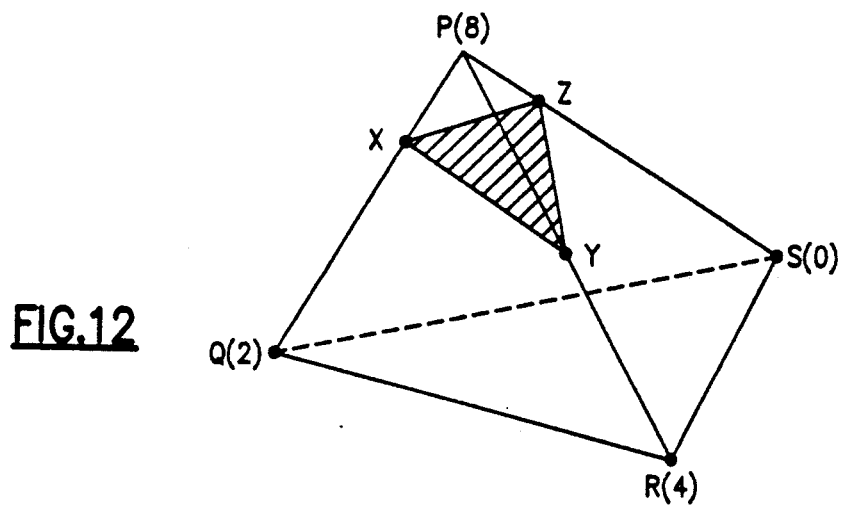
FIG. 12 is an illustration of the extraction of geometric data of an iso-valued surface from a tetrahedral element.

Tetrahedral model data, that is, (i) data of each vertex of a tetrahedron, (ii) a list of the IDs of vertices defining the tetrahedron, and (iii) the scalar value at each vertex of the tetrahedron, are generated from the results of a 3D FEM analysis. Since the method for generating the model from the general 3D FEM results consisting of various finite elements without regular connection was explained simply with reference to FIG. 11 and reference providing the details was provided, no detailed explanation is given here.

b) Generation of Tetrahedral Element Representative Vector Data

The approximate equation that gives the distribution of scalar values within a tetrahedron is given in the form of a linear combination of X, Y, and Z. That is, the equation giving a scalar value SCAL within a tetrahedron is given uniquely as follows:

$$SCAL = a_0 + a_x X + a_y Y + a_z Z \quad (1)$$

This is because $a_0$, $a_x$, $a_y$, and $a_z$ are determined uniquely by solving four simultaneous equations set up by substituting the position data of the four vertices of the tetrahedron, $(X_1, Y_1, Z_1)$, $(X_2, Y_2, Z_2)$, $(X_3, Y_3, Z_3)$, $(X_4, Y_4, Z_4)$ and their scalar values, SCAL1, SCAL2, SCAL3, and SCAL4, which are known beforehand, for equation (1). Such representation of the scalar values within the tetrahedron in the form of equation (1) makes it possible to think of the tetrahedron as a heap of iso-valued surfaces with a normal vector $(a_x, a_y, a_z)$. Therefore, the vector $(a_x, a_y, a_z)$ can be regarded as representative of normal vectors of the iso-valued surfaces actually contained in the tetrahedron. In other words, $(a_x, a_y, a_z)$ is the tetrahedral element representative vector. For further details of the equations used to generate the normal vector, see the Program Example A-4.

c) Generation of Vertex Representative Normal Vector Data

Next, vertex representative normal vector data are generated for each vertex of the tetrahedron. A vertex of a tetrahedron is generally shared with adjacent tetrahedral elements. Therefore, the simple average of normal vector data of the tetrahedron that are defined by the vertex is regarded as the vertex representative normal vector data in this embodiment. If the vertex is on the edge of the 3D space and defines only one tetrahedral element, the representative normal vector of the tetrahedral element directly becomes the representative normal vector of the vertex. For further details of the equations and program code used to calculate the normal vector at each vertex, see Program Example A-5.

d) Pixel Value Calculation

A tetrahedron is searched along each of a set of viewing rays starting from a given view-point, and is selected for processing if:
(1) the tetrahedron intersects the viewing ray, and
(2) the scalar value being visualized is equal to or smaller than the maximum of the scalar values at the four vertices, and is equal to or greater than the minimum of the scalar values of the four vertices.

Figure 2:
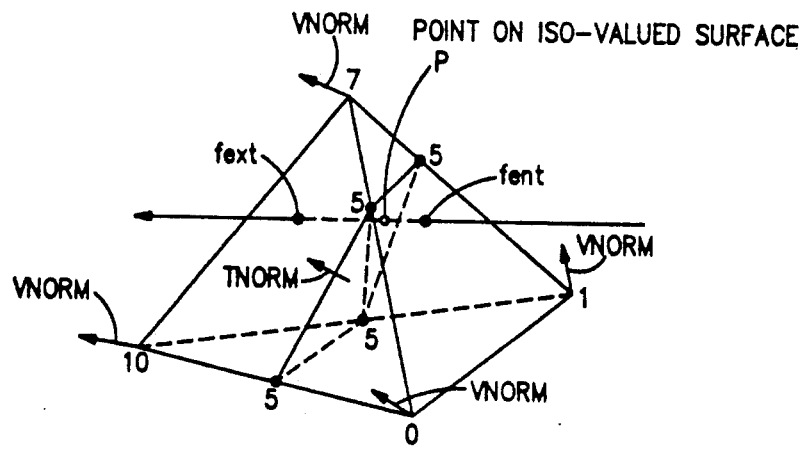
FIG. 2 is a perspective view of one example of a tetrahedron.
Figure 3:
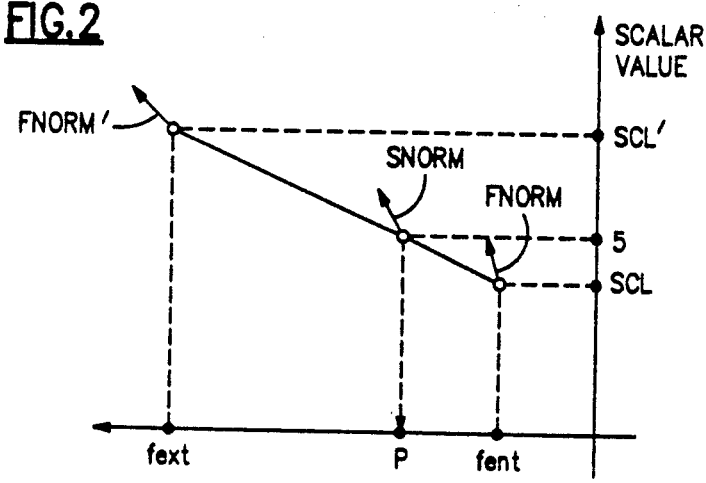
FIG. 3 is a graph illustrating the change in scalar values in a tetrahedral element along a viewing ray.

For each such tetrahedron found,
(3) the entry and exit points of the viewing ray to the tetrahedron, fent and fext, are obtained, and
(4) the normal vectors of the iso-valued surfaces at fent and fext, FNORM and FNORM', and their scalar values, SCL and SCL', are obtained by interpolation using the values at the three vertices of the triangles including fent and fext. In FIG. 2, TNORM is the tetrahedral element representative normal vector and VNORM is the vertex representative normal vector.

Process (2) is carried out by referring to the tetrahedral element list and classifying the tetrahedral elements according to their relation to the scalar value to be visualized. An example of program code used to classify the tetrahedrons is presented in Program Example A-3.

For each tetrahedron in which the scalar value being visualized lies between the two scalar values calculated by the interpolation,
(5) the intersection P between the iso-valued surface and the viewing ray is obtained, and
(6) the normal vector of the iso-valued surface SNORM at the intersection is calculated by interpolation.

Figure 4:
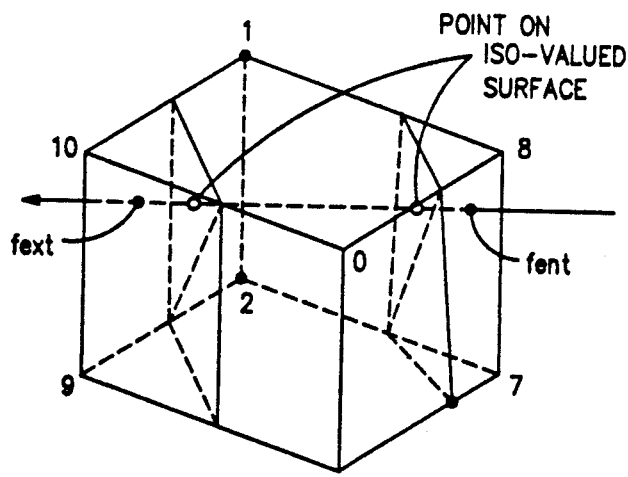
FIG. 4 is a perspective view of one example of a hexahedral element.
Figure 5:
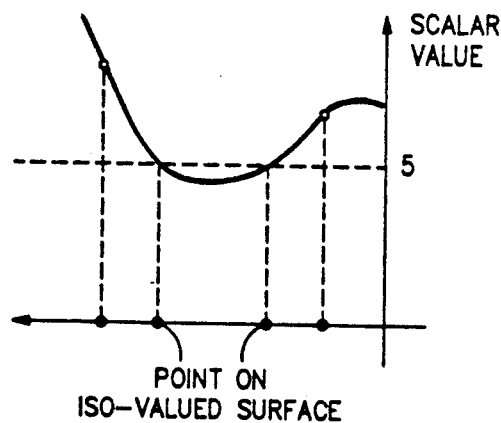
FIG. 5 is a graph illustrating the change in scalar values in a hexahedral element along a viewing ray.

Scalar values are distributed linearly on a segment piercing a tetrahedron, because scalar values are given by a linear expression of X, Y, and Z (formula 1) at points within it. Accordingly, evaluation of the scalar values at the entry and exit points of a ray to a tetrahedron, fent and fext, and comparison of the results with a scalar value C (five, for example), determine whether the iso-valued surface intersects the ray. Division of the space into hexahedral elements (the hexahedral model) is considered with reference to FIGS. 4 and 5. In order to obtain a point with a scalar value being visualized on a segment piercing a hexahedral element, a cubic equation has to be solved, because the distribution of scalar values on the segment is represented by a cubic function in a coordinate system with the segment as a coordinate axis. In other words, more than one iso-valued surface may be found on the segment. In addition, the calculation necessary to solve a cubic equation is very expensive in time and cost. On the other hand, if the space is divided into tetrahedral elements, as in the present invention (the tetrahedral model), it can easily be judged whether the iso-valued surface intersects the viewing ray with only the scalar values at fent and fext. This is an advantage of the tetrahedral model over the hexahedral model.

For ease of understanding, an iso-valued surface with scalar value five that comprises two triangles is illustrated in FIG. 2. It should be noted that geometric data on the iso-valued surface (triangle data) are never generated in the present invention. Without such geometric data, normal vector data on the iso-valued surface at the intersection with the viewing ray are generated by using vertex representative normal vector data, which are given for each vertex. Because one vertex is typically shared by more than four tetrahedral elements, the volume of vertex representative normal vector data never becomes large relative to the number of tetrahedral elements. Further, vertex representative normal vector data are used in common for any iso-valued surfaces with any scalar values. Therefore, when multiple iso-valued surfaces are displayed semi-transparently, the prior art method generates a large volume of triangle geometric data for each of the iso-valued surfaces, while the present invention utilizes vertex representative normal vector data repeatedly, which results in a much smaller volume of data being required for image generation.

Pixel value calculation is performed according to the position data of the intersection between the viewing ray and the iso-valued surface and the normal vector data of the iso-valued surface at the intersection. Such calculation is done in accordance with a known method such as Phong's model. For further details, and a program code example, see the description relative to FIG. 7 and Program Example A-7.

In accordance with the invention, different viewing rays have intersections at different positions on the same iso-valued surface in the same tetrahedral element, so that the interpolated normal vector data are also different. Therefore, the edges of triangles displayed on the screen are not highlighted relative to the enclosed areas. It is of course possible to modify the calculated pixel values in order to smooth the displayed image.

The essential part of data flow in accordance with the invention is mentioned above. Process (1) is performed in a perspective coordinate system and processes (3) to (6) are performed in an eye coordinate system. The processes in each coordinate system are described below in greater detail.

e) Processes in a Perspective Coordinate System

Figure 6:
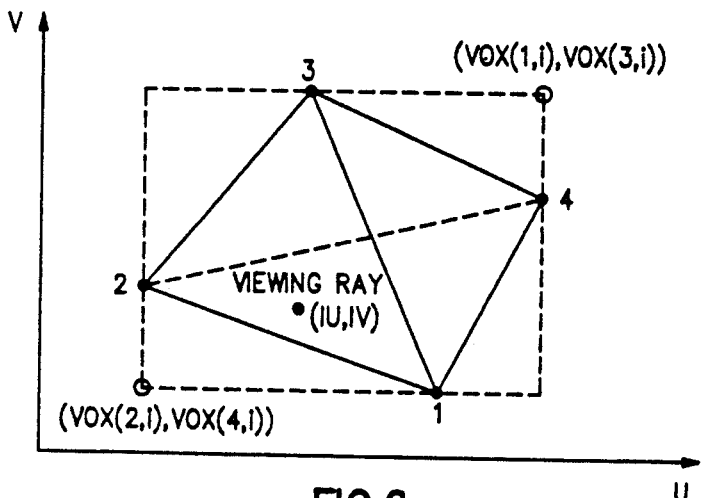
FIG. 6 is an illustration of a tetrahedral element in a perspective coordinate system.

In this kind of coordinate system, a viewing ray is mapped to coordinates (IU, IV), as shown in FIG. 6. A search is made to determine which tetrahedron intersects the viewing ray. In the example of FIG. 6, the viewing ray enters triangle 1-2-3 and exits triangle 4-1-2.

Z values (IW, IW') are interpolated on each of the triangles intersected by the viewing ray.

Subroutine TRJUDG (TRPT, IU, IV, IFLUG, S, T) is used to determine whether or not viewing ray (IU, IV) intersects triangle ((TRPT (i,j), i=1,2), j=1,3) (see attached material). In this subroutine, IU and IV are represented as follows:

$$IU = S \cdot TRPT(1,1) + T \cdot TRPT(1,2) + (1-S-T) \cdot TRPT(1,3)$$

$$IV = S \cdot TRPT(2,1) + T \cdot TRPT(2,2) + (1-S-T) \cdot TRPT(2,3)$$

If $0 \leq S \leq 1$, $0 < T < 1$, and $0 < S+T < 1$, point (IU, IV) is judged to be inside or on the edge of the triangle and IFLUG=1 is returned. IFLUG is used to determine whether the viewing ray is inside or outside the triangle. IW and IW' are interpolated according to (S,T).

f) Processes in an Eye Coordinate System

Figure 7:
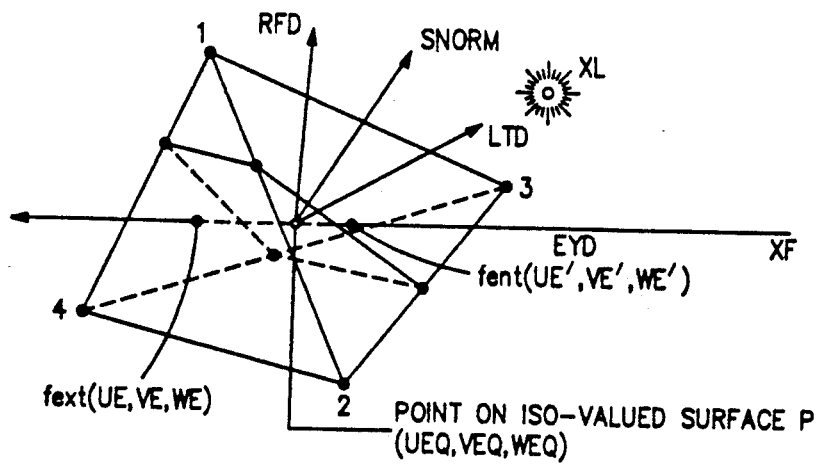
FIG. 7 is an illustration of the data required for pixel value calculation.

Next, the position data of fent and fext, namely (UE, VE, WE) and (UE', VE', WE') are obtained by transforming the two points (IU, IV, IW), (IU, IV, IW') into the eye coordinate system (see FIG. 7).

S and T, mentioned above, cannot be used for the interpolation of scalar values and normal vector at fent and fext, because a perspective transformation does not preserve the segment ratio. Therefore, (S, T) in the eye coordinate system is obtained by applying TRJUDG again to (UE, VE) and UE', VE'). Scalar values and normal vector at fent and fext, ((SCL, SCL'), (FNORM, FNORM')), are interpolated according to this (S, T). Calculation of coordinates and normal vector at a point on an iso-valued surface according to these data takes advantages of the fact that scalar values and normal vectors change linearly along any segment within a tetrahedron. That is, a point $(X_C, Y_C, Z_C)$ on the segment that links point A, $(X_A, Y_A, Z_A)$, and point B, $(X_B, Y_B, Z_B)$, is represented as follows:

$$\begin{bmatrix} X_C \\ Y_C \\ Z_C \end{bmatrix} = S \times \begin{bmatrix} X_A \\ Y_A \\ C_A \end{bmatrix} + (1-S) \times \begin{bmatrix} X_B \\ Y_B \\ C_B \end{bmatrix}$$

Scalar value distribution in a tetrahedron is represented by:

$$f = a_0 + A_x X + a_y Y + a_z Z$$

Accordingly, scalar value distribution along the segment AB is represented as follows:

$$\begin{aligned} f &= a_0 + a_x X_c + a_y Y_c + a_z Z_c \\ &= a_0 + a_x \{SX_A + (1-S) X_B\} + \\ &\quad a_y \{sY_A + (1-S) Y_B\} + \\ &\quad a_z \{SZ_A + (1-S) Z_B\} \\ &= S\{a_0 + a_x X_A + a_y Y_A + a_z Z_A\} + \\ &\quad (1-S)\{a_0 + a_x X_B + a_y Y_B + a_z Z_B\} \\ &= Sf_A + (1-S) f_B \end{aligned}$$

This is linear distribution.

Assuming that the scalar value being visualized is C, the weight coefficients for linear interpolation p, q (p+q=1) are as follows:

$$p = (C - SCL')/(SCL - SCL')$$

$q = (SCL' - C)/(SCL - SCL')$

The coordinate values (UEQ, VEQ, WEQ) and normal vector (SNORM(j)(j=1,3)) are as follows:

$UEQ = p\ UE + q\ UE'$ $VEQ = p\ VE + q\ VE'$ $WEQ = p\ WE + q\ WE'$ $SNORM(1) = p\ FNORM(1) + q\ FNORM'(1)$ $SNORM(2) = p\ FNORM(2) + q\ FNORM'(2)$ $SNORM(3) = p\ FNORM(3) + q\ FNORM'(3)$

The light direction vector (LTD(j)(j=1,3)) is obtained from (UEQ, VEQ, WEQ) and the position data of the light source point XL, and the cosine DOTDF of the angle between the light and the normal, which is required to calculate the diffuse reflection, is calculated. Further, the reflected light direction vector (RFD(j)(j=1,3)) is obtained from the light direction vector, DOTDF, and the normal vector, and the cosine DOTRF of the angle between the viewing ray and the normal, which is required to calculate the specular reflection, is calculated. Pixel values ((IPIXEL(i,j), i=1,3, j=1,1024) are obtained from the two calculated cosines.

Output Data

An image file for RGB (3×1024 ×1024 pixels, eight bits per pixel) is created.

One use of the invention, for generating image data on iso-valued surfaces, is described above. Needless to say, various other examples are conceivable. For example, in the above embodiment, the vertex representative normal vector is calculated by obtaining a simple average of the representative normal vectors of the tetrahedrons sharing the vertex. In another embodiment, however, it can be calculated by obtaining the average of the representative normal vectors weighted by the solid angles of the tetrahedrons. The weighting factor can be the distance between the vertex and the gravity center of the tetrahedron sharing it in still another embodiment.

Further, the space is virtually divided into tetrahedral elements as defined by the node points that are generated and distributed irregularly by 3D FEM and those that are added later in the above embodiment. However, the invention can be applied to the case where scalar values are provided with the points on the structured grid. Koide et al., in "Tetrahedral Grid Method for Equi-valued Surface Generation," Proceedings of the 35th annual convention of Information Processing Society of Japan, 13G-10 (1987), disclose a method for the division of such a structured grid addition, which is equivalent to node point addition in the above embodiment, is never performed. The process after the division of the structured grid space into tetrahedral elements is the same as in the above embodiment.

In accordance with the invention, image data of an iso-valued surface formed by a set of points with the same scalar value are generated at high speed and without the need for much memory when scalar values are provided beforehand with points distributed in 3D space.

Program Examples

I. Data given at the time of division into tetrahedrons
Vertex Coordinates          pointw(j,i)
                            (j=1,3, i=1,Npoint)
Vertex List                 iconnect(j,i)
(For each tetrahedron)   (j=1,4, i=1,Ntetra (i denotes ID of a tetrahedron. This is a tetrahedral element list)).
Scalar Value   SCAL(i)   (i=1,Npoint)
(For each vertex)
Scalar Value to be visualized
CRT(i)   (i-1,NCRT)   (ascending order)
View-point, reference point, light source
XF(i), XA(i), XL(i)   (i=1,3)

Here, Npoint denotes the total number of vertices, Ntetra denotes the total number of tetrahedrons, and NCRT denotes the total number of iso-valued surfaces.

II. Processes
1. Transformation of vertex coordinates into an eye coordinate system and into a perspective coordinate system

```
do  i=1,Npoint
    do  j=1,3
        pointi(j)=pointw(j,i)
        pointi(4)=1.0
        CALL MAT1(pointi,MATE,pointo)
    do  j=1,3
        pointE(j,i)=pointo(j)
    UMAX=max(UMAX,pointE(1,i))
    UMIN=min(UMIN,pointE(1,i))
    VMAX=max(VMAX,pointE(2,i))
    VMIN=min(VMIN,pointE(2,i))
    WMAX=max(WMAX,pointE(3,i))
    WMIN=min(WMIN,pointE(3,i))
```

* max(a,b) denotes the member of a and b that is not smaller, while min(a,b) denotes the member that is not greater.

Here, MAT1 is a subroutine that multiples (pointi(i),i=1,4), a point represented by a homogenous coordinate system, by transformation matrix MATE (4,4) and returns the result to (pointo(i), i=1,4). MATE (4,4) is an eye transformation matrix determined on the basis of XA (3) and XF (3).

```
do  i=1,Npoint
    do  j=1,3
        pointi(j)=pointE(j,i)
        pointi(4)=1.0
        CALL MAT1(pointi,MATP,pointo)
    do  j=1,3
        pointP(j,i)=(pointo(j)+1.0) 512
    IVMAX=max(IVMAX,pointP(2,i))
    IVMIN=min(IVMIN,pointP(2,i))
```

MATP (4,4) is a perspective transformation matrix determined on the basis of K (half of the screen size) and H (the distance between the eye of and the plane of projection). Default values are determined as follows:

$K = \frac{1}{2} \times \max(|UMAX|, |VMIN|, |UMAX|, |VMIN|)$
$H = \frac{1}{2} \times WMIN$ An eye transformation and a perspective transformation are also performed for eye point XA (3) and the results are stored in XAE (3) and XAP (3), respectively.

2. Setting of a Circumscribed Rectangle (a Perspective

-continued

```
Coordinate System) for Each Tetrahedron
do   i=1,NTETRA
   do   j=1,4
      UMX=max(UMX,pointP(1,iconnect(j,i)))
      UMN=min(UMN,pointP(1,iconnect(j,i)))
      VMX=max(VMX,pointP(2,iconnect(j,i)))
      VMN=min(VMN,pointP(2,iconnect(j,i)))
   VOX(1,i)=UMX
   VOX(2,i)=UMN
   VOX(3,i)=VMX
   VOX(4,i)=VMN
```

Figure 8:
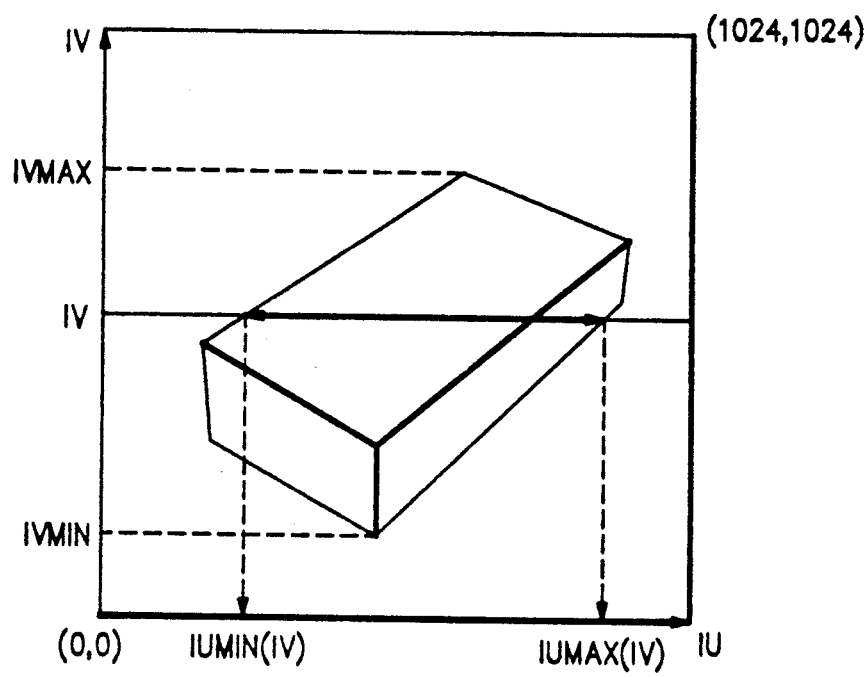
FIG. 8 is an illustration of a circumscribed rectangle of a tetrahedral element in a perspective coordinate system.

The perspective coordinates of (IU, IV) are normalized to a screen size of 1024×1024 during step 1 (See FIG. 8). Therefore, the area subject to pixel value calculation is known for the IV component on the basis of IVMAX and IVMIN. Next, the areas subject to pixel value calculation, IUMAX(IV) and IUMIN(IV), are found for each IV by using the obtained VOX(4, NTETRA) (See FIG. 6).

```
do   IV=IVMIN,IVMAX
   IUMAX(IV)=0
   IUMIN(IV)=9999
   do   i=1,NTETRA
      if(VOX(3,i) IV and VOX(4,i) IV)
         then
         IUMAX(IV)=max(VOX(1,i),IUMAX(IV))
         IUMIN(IV)=min(VOX(2,i),IUMIN(IV))
      endif
```

3. Classification of tetrahedrons based on scalar values at vertices

Tetrahedrons are classified according to which of the scalar values to be visualized (CRT(i)) they contain. A binary number of ICRT digits is given. A rule is adopted that the i-th digit is set to 1 if the scalar value CRT(i) is contained in the tetrahedron. The resultant number is stored into the array ICLASS(NTETRA).

```
do   i=1,NTETRA
   ICLASS(i)=0
   do   j=1,ICRT
      if(max(SCAL(iconnect(1,i)),
             SCAL(iconnect(2,i)),
             SCAL(iconnect(3,i)),
             SCAL(iconnect(4,i)) CRT(j)
         and
         min(SCAL(iconnect(1,i)),
             SCAL(iconnect(2,i)),
             SCAL(iconnect(3,i)),
             SCAL(iconnect(4,i)) CRT(j))
         then
         ICLASS(i)=ICLASS(i)+2^(j-1)
      endif
```

4. Normal Vector Calculation for Each Tetrahedron

Assume that the scalar value distribution is described as shown in the following equation:

$$SCAL = a_0 + a_x X + a_y Y + a_z Z$$

The normal vector TNORM of iso-valued surfaces in the tetrahedron can then be calculated as follows:

$$\begin{bmatrix} TNORM(1, i) \\ TNORM(2, i) \\ TNORM(3, i) \end{bmatrix} = grad(SCAL) = \begin{bmatrix} a_x \\ a_y \\ a_z \end{bmatrix}$$

The following equations are satisfied at the four vertices of the tetrahedron.

$$SCAL1 = a_0 + a_x X_1 + a_y Y_1 + a_z Z_1 \quad (1)$$

$$SCAL2 = a_0 + a_x X_2 + a_y Y_2 + a_z Z_2 \quad (2)$$

$$SCAL3 = a_0 + a_x X_3 + a_y Y_3 + a_z Z_3 \quad (3)$$

$$SCAL4 = a_0 + a_x X_4 + a_y Y_4 + a_z Z_4 \quad (4)$$

The following equations are obtained by calculating (1)–(4), (2)–(4), and (3)–(4) to eliminate $a_0$.

$$\begin{bmatrix} SCAL1 - SCAL4 \\ SCAL2 - SCAL4 \\ SCAL3 - SCAL4 \end{bmatrix} =$$

$$\begin{bmatrix} X_1 - X_4 Y_1 - Y_4 Z_1 - Z_4 \\ X_2 - X_4 Y_2 - Y_4 Z_2 - Z_4 \\ X_3 - X_4 Y_3 - Y_4 Z_3 - Z_4 \end{bmatrix} \times \begin{bmatrix} a_x \\ a_y \\ a_z \end{bmatrix}$$

TNORM is obtained by solving the above equations for ($a_x$, $a_y$, $a_z$).

```
do   i=1,NTETRA
   do   j=1,3
      do   k=1,3
         A(k,j)=pointE(j,iconnect(k,i))
                -pointE(j,iconnect(4,i))
      do   k=1,3
         B(k)=SCAL(iconnect(k,i))
-SCAL(iconnect(4,i))
   CALL GAUSS (A,B,X)
   do   k=1,3
      TNORM(k,i)=X(k)
```

Here, GAUSS (A, B, X) is a subroutine for solving simultaneous equations with three unknowns by the Gauss elimination method. A is a coefficient matrix, B is a right-hand side vector and X is a solution vector.

5. Normal Vector Calculation at Each Vertex

VNORM (j,i) (j=1,3, i=Npoint) is obtained for each vertex on the basis of TNORM (j,i) (j=1,3, i=Ntetra), which is calculated for each tetrahedron. For each vertex, the assigned TNORM (j,i) is added and the sum is divided by the number of tetrahedra connected to the vertex.

```
Initialization of VNORM(j,i), ICOUNT(i)
do   i=1,Ntetra
   do   j=1,4
      do k=1,3
         VNORM(k,iconnect(j,i))
            =TNORM(k,i)+VNORM(k,iconnect(j,i))
         ICOUNT(iconnect(j,i))
            =ICOUNT(iconnect(j,i))+1
do   i=1,Npoint
   do   j=1,3
```

VNORM(j,i)=VNORM(j,i)/ICOUNT(i)

6. Assignment of Color to Iso-Valued Surface

Figure 9:
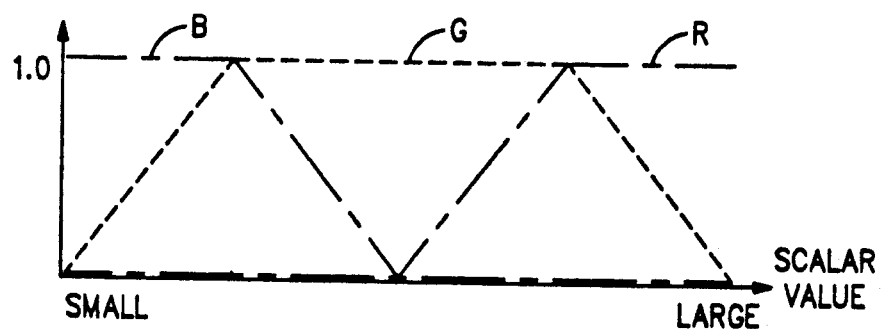
FIG. 9 is an illustration of an assignment of colors to iso-valued surfaces.
Figure 10:
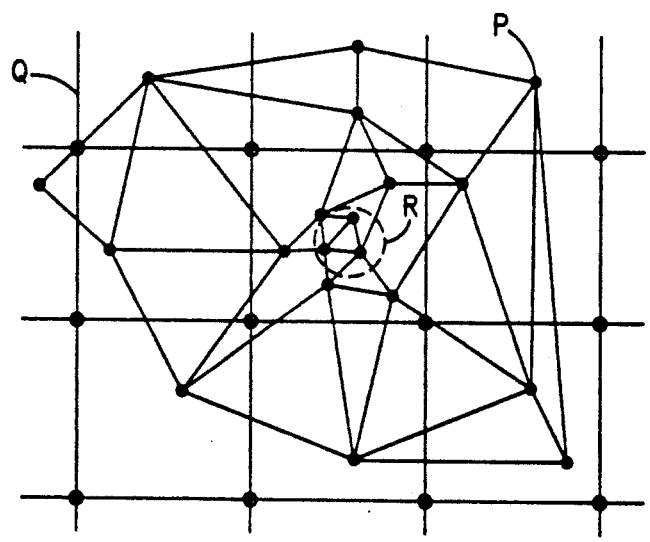
FIG. 10 is an illustration of mapping of an FEM grid to an orthogonal grid.

The ratio of R (red), G (green), and B (blue) is predetermined according to the scalar value, as shown in FIG. 9.

```
if (ICRT=1) then
do  i=1,ICRT
    RGB(1,i)=min(1.0,max((CRT(i)
             −0.5(CRT(ICRT)+CRT(1)))/
             (CRT(ICRT)−CRT(1)) 0.25,0.0)
    RGB(2,i)=min(1.0,max( (CRT(i)
             −0.5(CRT(ICRT)+CRT(1))
             +0.5(CRT(1)−CRT(ICRT)))/
             (CRT(1)−CRT(ICRT)) 0.25,0.0)
    RGB(3,i)=min(1.0,max((CRT(i)
             −0.5(CRT(ICRT)+CRT(1)))/
             (CRT(1)T−CRT(ICRT)) 0.25,0.0)
else
    RGB(1,1)=1.0
    RGB(2,1)=0.2
    RGB(3,1)=0.0
endif
```

7. Pixel Value Calculation

Each time the calculation of pixel values (PIXEL (1024,3)) is completed for one scan line (with constant IV), the results are written into an external file. All pixels have the value 0 in the upper background area (IV=IVMAX+1,1024).

```
do  IV=1024, IVMAX+1,−1
do  i=1,3
    WRITE(i) (PIXEL(j,i), j=1,1024)
```

For each pixel (IU, IV) in the pixel value calculation area (IV=IVMIN, IVMAX), a tetrahedron that contains it is searched. The scalar values SCL(2) at the entry and exit points to the tetrahedron of the ray that corresponds to the pixel, fent and fext, are then obtained and compared with the scalar value to be visualized, CRT(ICRT), to determine whether an iso-valued surface exists, the pixel value is calculated by using Phong's model and the result is stored into array PIC-(i,j) (i=1,100;j=1,4) together with the Z value of the iso-valued surface. When every tetrahedron has been stored, the array is sorted by using PIC (i,4) (i=1,100) in descending order as keys.

```
PIXEL(IU,j)=0.0
do  i=1,NFACE
    PIXEL(IU,j)=PIC(i,j)+PIXEL(IU,j) KT
```

Here, KT is the transparency of the iso-valued surface and NFACE is the number of iso-valued surfaces. The information on all the iso-valued surfaces intersected by one viewing ray influences the pixel value calculation for the ray in such imaging of multiple semi-transparent iso-valued surfaces.

When this work is completed for one scan line, the results are written into the external file. The details are given in the list below, where comments are marked.

```
do  IV=IVMAX,IVMIN
    do  IU=IUMIN(IV),IUMAX(IV)
        IS=0
        do  i=1,NTETRA
            if (ICLASS(i) NE 0) then
                if (VOX(2,i) IU VOX(1,i) and VOX(4,i) IV
VOX(3,i)) then
                    ii=0 do k=1,4
do j=1,3
                    IDP(j,ii+1)
                      =iconnect(MOD(k+j−1,4)
                      +1,i)
                    TRPT(1,j)
                      =pointP(1,IDP(j,ii+1))
                    TRPT(2,j)
                      =pointP(2,IDP(j,ii+1))
                if(max(TRPT(1,1),TRPT(1,2),
                    TRPT(1,3)) IU min(TRPT(1,1),
                    TRPT(1,2),TRPT(1,3))
                    and
                    max(TRPT(2,1),TRPT(2,2),
                    TRPT(2,3) IV min(TRPT(2,1),
                    TRPT(2,2),TRPT(2,3)))
                then
                CALL TRJUDG
                        (TRPT,IU,IV,IFLUG,S,T)
                if(IFLUG=1)  then
                    ii=ii+1
                    kk(ii)=k
                    w=S pointP(3,IDP(1,ii))
                      +T pointP(3,IDP(2,ii))
                      +(1−S−T)
                         pointP(3,IDP(3,ii))
                    if (ii=2)  then
                        if(W=WOLD)  then
                            ii=ii−1
                            go to 350
[Z values at fent and fext are different.]
                        endif
                    else
                        WOLD=W
                    endif
                    pointI(4)=1.0
                    pointI(3)=W/512.0−1.0
                    pointI(2)=V/512.0−1.0
                    pointI(1)=U/512.0−1.0
                    CALL MAT1
                        (pointI,MATPI,point0)
MATPI is an information matrix]
                    UE(ii)=point0(1)
                    VE(ii)=point0(2)
                    WE(ii)=point0(3)
do j=1,3
                    TRPT(1,j)
                      =pointE(1,IDP(j,ii))
                    TRPT(2,j)
                      =pointE(2,IDP(j,ii))
                    U=UE(ii)
                    V=VE(ii)
                CALL TRJUDG
                        (TRPT,U,V,IFLUG,S,T)
                SCL(ii)
                      =S SCAL(IDP(1,ii))
                      +T SCAL(IDP(2,ii))
                      +(1−S−T)
                         SCAL(IDP(3,ii))
[Scalar value calculation at fent and fext.]
                    do  j=1,3
                        FNORM(j,ii)
                          =S VNORM(j,IDP(1,ii))
                          +T VNORM(j,IDP(2,ii))
                          +(1−S−T)
                             VNORM(j,IDP(3,ii))
[Normal vector calculation at fent and fext.]
                endif
                f (k=3 and ii=0)  go to 300
                if (ii=2    )  go to 390
CONTINUE
CALL INDFIX
        (ICLASS(i),ICRTMIN,ICRTMAX,ICRT)
            [The subroutine INDFIX returns the maximum
              and the minimum values of the Index of the
```

-continued

```
   contained iso-valued surfaces from
   ICLASS(i), which is an attribute of the
   tetrahedron. Pixel values are calculated
   for each Index.]
   do  IC=ICRTMIN,ICRTMAX
    if((SCL(1)-CRT(IC))
      (SCL(2)-CRT(IC)) 0)  then
     if(SCL(1)=SCL(2))  then
      P=_(CRT(IC)-SCL(2))
       /(SCL(1)-SCL(2))_
      Q=_(CRT(IC)-SCL(1))
       /(SCL(1)-SCL(2))_
   [Weight calculation at fent and fext]
    else
     go to 300
    endif
     UEQ=P UE(1)+Q UE(2)
     VEQ=P VE(1)+Q VE(2)
     WEQ=P WE(1)+Q WE(2)
   [Coordinates of P on iso-valued surface
    (Eye coordinate system)]
    do   j=1,3
     SNORM(j)=P FNORM(j,1)
            +Q FNORM(j,2)
   [Normal vector of iso-valued surface]
    CALL NORMLZ(SNORM)
   [Normalization of vector]
    LTD(1)=XLE(1)-UEQ
    LTD(2)=XLE(2)-VEQ
    LTD(3)=XLE(3)-WEQ
   [Light direction vector]
    CALL NORMLZ(LTD)
    EYD(1)=XFE(1)-UEQ
    EYD(2)=XFE(2)-VEQ
    EYD(3)=XFE(3)-WEQ
   [Viewing ray direction vector]
    CALL NORMLZ(EYD)
    DOTDF=LTD(1)  SNORM(1)
         +LTD(2)  SNORM(2)
         +LTD(3)  SNORM(3)
   [Cosine of angle between light and
    normal]
    do   j=1,3
     RFD(j)=2.0 DOTDF
           SNORM(j)-LTD(j)
   [Reflected light direction vector]
    DOTRF=EYD(1) RFD(1)
         +EYD(2) RFD(2)
         +EYD(3) RFD(3)
   [Cosine of angle between viewing ray and
    reflected light]
    IS=IS+1
    do   j=1,3
     PIC(IS,j)=(RGB(j,IC)
       *KD _DOTDF_ [diffused light]
       +KR (max(DOTRF,0.0))**8
         [reflected light]
       +KS RGB(j,IC))*128.0
         [scattered light]
     PIC(IS,4)=WEQ
    endif
   CONTINUE
     ISMAX=IS
     do   Ij=1,ISMAX
     TTK(Ij)=1.0
     do   IS=1,ISMAX
      if(PIC(Ij,4) PIC(IS,4))
      TTK(Ij)=0.5TTK(Ij)
   [Setting the transparency by comparing Z
    values]
     do   j=1,3
      PICC(j)=PICC(j)
            +P(Ij,j)*TTK(ij)
     do   j=1,3
     IPIXEL(IU,J)=min(255.0,PICC(j))
     PICC(j)   =0
   CONTINUE
     do   j=1,3
     WRITE(j)(IPIXEL(K,j),K=1,1024)
     do   i=IUMIN(IV), IUMAX(IV)
     do   j=1,3
     IPIXEL(i,j)=0
     CONTINUE
     do   i=1,IVMIN-1
      WRITE(i) (IPIXEL(i,j),j=1,1024)
[Image file creation for the lower background area]
```

We claim:

1. A method for generating an image of an iso-valued surface on a display device in a computer graphics display system having a processor, a storage device, and a display device, wherein a plurality of defined points having positions in a three dimensional space and an associated scalar value are stored in said storage device, and wherein a scalar value to be displayed as an iso-valued surface is arbitrarily selected, the method comprising the steps of:

dividing said three dimensional space into tetrahedral elements having as vertices defined points and generating an element list relating each tetrahedral element to its vertices, transforming said positional data of said vertices associated with each of said tetrahedral elements to generate data representing a tetrahedral element representative normal vector which is the normal vector of all iso-valued surfaces contained in the tetrahedral element, generating for each vertex of each of said tetrahedral elements data representing a normal vector associated with the vertex ("vertex representative normal vector") based upon tetrahedral element representing normal vectors of those tetrahedral elements that comprise the vertex, and generating image data representing an iso-valued surface with said prespecified scalar value based upon said tetrahedral element list and said representative normal vector data.

2. The method of claim 1, wherein said defined points are points generated by a three dimensional finite element method, and wherein in said dividing step, new node points are added and the position data and scalar values for them are generated before dividing the space into tetrahedral elements.

3. A computer display system for generating an image of an iso-valued surface, based upon defined data points oriented in three dimensional space each having position data and a scalar value, wherein a scalar value for said iso-value surface is arbitrarily specified, the method comprising the steps of:

virtually dividing said space into tetrahedral elements that have as vertices the defined data points and generating an element list relating each of said tetrahedral element to its vertices, transforming said element list to generate for each tetrahedral element a tetrahedral element representative normal vector which is the normal vector of all iso-value surfaces contained in said tetrahedral element, said transformation operating on the position data and scalar values of the vertices of said tetrahedral element, generating for each vertex of each of said tetrahedral elements, data representing a normal vector associated with each of said vertices, (referred to as the vertex representative normal vector) based upon the tetrahedral element representative normal vectors of the tetrahedral elements that comprise the vertex, for each of a plurality of viewing rays starting from a predetermined viewpoint, selecting a tetrahedral element through which said viewing ray passes and that possibly contains iso-valued surface with said specified scalar value, by processing said element list, generating position data representing an entry and an exit intersection between said selected tetrahedron and said viewing ray, interpolating to find a scalar value for each of said intersections according to their position data, the position data of said vertices defining said selected tetrahedron and the scalar values of the vertices, testing whether said specified scalar value is included in the interval defined by said interpolated scalar values, if said test determines that said scalar value is included, generating a segment that links said entry and exit intersection through a point P that has specified scalar value, interpolating at the point P, position data of point P and data representative of a normal vector N of the iso-valued surface, generating image data associated with the viewing ray based upon said position data of point P and said data of said normal vector N, and displaying said generating image on a display device.

4. A computer graphics display system for displaying iso-valued surfaces of a three dimensional model, wherein a plurality of points distributed in three dimensional space are specified by position and wherein each point has a scalar value assigned, said system comprising:

first storage means for storing said points including said position data and said scalar value, means for virtually dividing said space into tetrahedral elements that have as vertices the points stored in said storage means, second storage means for storing an element list relating each tetrahedral element to its vertices, means for generating, for each tetrahedral element on said element list, a tetrahedral element representative normal vector which is the normal vector for all iso-valued surfaces contained in the tetrahedra element based upon said position data and scalar values of the vertices of the tetrahedral element, means for generating for each vertex of each of said tetrahedral element, a vertex representative normal vector based upon said tetrahedral element representative normal vectors of the tetrahedral elements that comprise the vertex, third storage means for storing said vertex representative vectors, and means for generating image data representing an 28 iso-valued surface with said specified scalar value based on the element list and the vertex representative normal vectors stored respectively in said second and third storage means.

5. The system of claim 4 wherein said points in three dimensional space are defined and said scalar values assigned by a three dimensional finite element method, and, said means for generating tetrahedral elements includes a means for adding new points, and for generating position data and a scalar value for said new points.

6. A computer graphics display system for generating and displaying an image of an iso-valued surface for a predefined scalar value based upon defined points in a three dimensional space, each of said defined points having an assigned scalar value, said system comprising:

storage means for storing said points including said position data and scalar values, means for virtually dividing said three dimensional space into tetrahedral elements that have as vertices said defined points, storage means for storing an element list relating each tetrahedral element to its vertices, means for generating for each of said tetrahedral elements, a tetrahedral element representative normal vector which is the normal vector of all iso-valued surfaces contained in said tetrahedral element, based upon said position data and said scalar values of the vertices of the tetrahedral element, means for generating for each vertex of said tetrahedral element, data representing a normal vector associated with the vertex (the vertex representative normal vector) based upon said tetrahedral element representative normal vectors of said tetrahedral elements that comprise said vertex, storage means for storing said vector data, means for selecting for each of a plurality of viewing rays emanating from a predetermined viewpoint, which ones of said tetrahedral elements intersect said ray and potentially contain an iso-valued surface having said specified scalar value, means for generating position data for two intersections between said selected tetrahedra and said viewing ray, means for interpolating scalar values at said intersections according to their position data, position data of the vertices defining said selected tetrahedron, and said scalar values of the vertices, means for testing whether said specified scalar value is included in an interval defined by said interpolated scalar values at said intersections, means for generating a segment linking said intersections through a point P having said specified scalar value if said means for testing returns an affirmative result, means for interpolating at said point P, data representing a normal vector N of the iso-valued surface, means for generating image data associated with said view ray according to said position data of point P and said data of normal vector of N and means for displaying said generated image data on a display device.

* * * * *